United States Patent [19]

Russell, Jr.

[11] 4,091,975

[45] May 30, 1978

[54] ANTHROPOMORPHIC SHOULDER MOUNT

[75] Inventor: Jerry C. Russell, Jr., Redwood City, Calif.

[73] Assignee: International Video Corporation, Sunnyvale, Calif.

[21] Appl. No.: 683,088

[22] Filed: May 4, 1976

[51] Int. Cl.² ............................................. A45F 5/00
[52] U.S. Cl. ................................... 224/5 V; 224/5 P
[58] Field of Search .............. 224/5 R, 5 A, 5 B, 5 H, 224/5 P, 5 V, 25 R, 25 A, 5.1, 5 M, 5 N, 5 BC, 5 Q, 5 MA, 42.45 R, 42.42 R

[56] References Cited

U.S. PATENT DOCUMENTS

| 578,572 | 3/1897 | Lashells | 224/5.1 |
| 1,448,918 | 3/1923 | Drager | 224/25 A |
| 2,353,537 | 7/1944 | Arnesen | 224/5 H UX |
| 2,506,685 | 5/1950 | Sadloski et al. | 224/5 P X |
| 2,552,844 | 5/1951 | Clinehens | 224/25 R X |
| 3,767,095 | 10/1973 | Jones | 224/25 A X |
| 3,934,769 | 1/1976 | Carlson | 224/25 A X |

Primary Examiner—Trygve M. Blix
Assistant Examiner—Jerold M. Forsberg
Attorney, Agent, or Firm—Limbach, Limbach & Sutton

[57] ABSTRACT

An anthropomorphic shoulder mount for supporting a camera or similar device. Three modes of shoulder pad motion are provided to permit good conformance to the operator's shoulder contour regardless of anthropomorphic variations among various operators. An articulated saddle adjustably hinges forward and rearward from a fixed center section to conform to the operator's upper back and chest. The camera support adjustably rotates about a longitudinal axis to accommodate the slope of either of the operator's shoulders. Further, the camera support adjustably translates along the longitudinal axis to permit optimization of the center of gravity on the operator's shoulder.

4 Claims, 5 Drawing Figures

ANTHROPOMORPHIC SHOULDER MOUNT

BACKGROUND OF THE INVENTION

The invention relates generally to shoulder mounts for camera type devices and more particularly to a shoulder mount having easily adjustable load-bearing shoulder pads about three axes to provide conformance to a wide range of anthropomorphic variations among human camera-type device operators.

Throughout this application reference will be made to the use of the present shoulder mount for support of a camera, as an example of the primary utility of the invention. It will be understood, however, that the inventive shoulder mount is useful for supporting other types of devices on the shoulder of a human operator, wherein such devices are of a reasonable size and weight for such human support.

Prior art camera shoulder mounts have failed to fully adapt to the anthropomorphic variations of the human operator, thus adversely affecting camera stability and creating operator discomfort and fatigue.

SUMMARY OF THE INVENTION

In accordance with the teachings of the present invention, an anthropomorphic shoulder mount is provided having adjustment of the load-bearing shoulder pads about three axes to provide conformance to a wide range of operator body variations.

An articulated padded saddle has forward and rearward pads that hinge from a fixed center section. A knob, adjustable by the operator while the mount is in place on his shoulder, drives an articulated linkage and cam arrangement in the center section to simultaneously rotate the forward and rearward pads to or from the operator's body, to permit close conformance between the pads and the operator's upper back and chest. The center section rests on top of the shoulder, however, unlike typical prior art mounts, the close conformance of the forward and rearward pads to the operator's body causes the camers and mount weight to be distributed not only on the shoulder top, but to a large extent also on the chest and upper back, thereby greatly increasing operator comfort, particularly during extended periods of usage.

A second knob, also adjustable by the operator while the mount is in place, allows rotational and translational movement of the camera along a longitudinal axis.

Rotational adjustment of the camera allows the camera to be aligned substantially vertically and parallel to the neck of the operator, thereby allowing for various shoulder slopes in different persons. Rotation in both directions from the vertical allows use on either shoulder.

Translational movement of the camera relative to the mount allows optimization of the center of gravity of the camera and mount, thereby evenly distributing the weight on the operator's chest, shoulder and back.

The present shoulder mount not only increases operator comfort and reduces operator fatigue but enhances the ability of the operator to aim the camera and to perform smooth camera pans. In many cases, depending on the camera weight and operator ability, "hands-free" operation of the camera is possible.

Additionally, the features of the inventive shoulder mount permit lightweight implementation to further reduce operator fatigue.

These and other advantages and features of the invention will be perceived and understood further as the following description of the preferred embodiment is read in conjunction with the drawings.

DESCRIPTION OF THE PREFERRED EMBODIMENT

Figure 1:
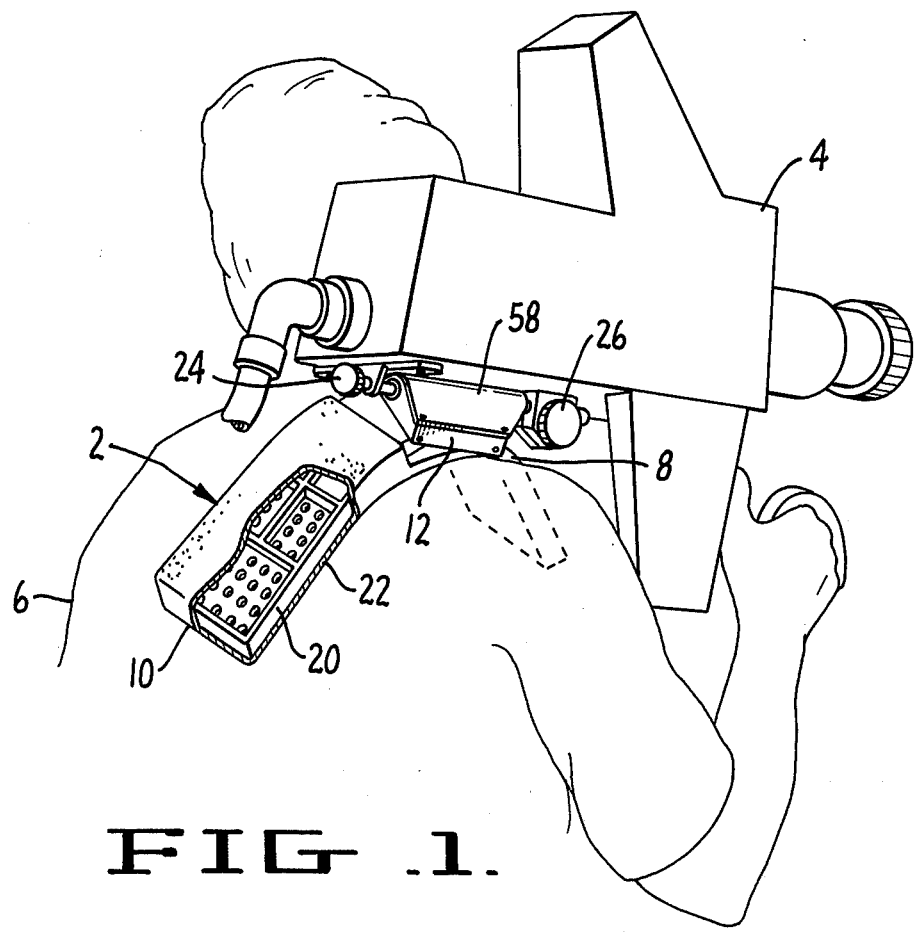
FIG. 1 — partially cut-away perspective view of the anthropomorphic shoulder mount of the present invention supporting a camera on the shoulder of an operator.

Referring first to FIG. 1 of the drawings, the anthropomorphic shoulder mount of the present invention is shown generally at 2, supporting a television camera 4 on the right shoulder of an operator 6. The articulated shoulder saddle comprises the forward shoulder pad 8, the rearward shoulder pad 10 and the shoulder mount center support and linkage housing 12. Knob 24 adjusts the conformance of pads 8 and 10 to the operator's chest and upper back. Knob 26 permits the rotation and translation of the camera 4 along a longitudinal axis with respect to the shoulder mount 2, to compensate for the operator's shoulder slope and to center the weight evenly on the operator's upper back, shoulder and chest.

Forward pad 8 and rearward pad 10 include, respectively, internal paddle 18 (FIG. 2) and internal paddle 20. A foam pad and vinyl covering 22 cover the paddles 18 and 20 and the bottom side of the center support 12. In one practical embodiment of the invention, and by way of example only, the paddles 18 and 20 are formed from cast aluminum and the padding is a medium density recomposition rubber to reduce weight in the actual embodiment, the paddles have a plurality of holes (FIG. 1) and ribbed areas to reduce the overall thickness and mass.

It will be noted that the forward paddle 18 is straight and the rearward paddle 20 is curved, so as to conform generally to the human chest and upper back, respectively.

Referring now also to the remaining figures, the preferred embodiment will be described in greater detail.

Rotation of the forward and rearward pads 8 and 10 occurs along hinge pins 14 and 16, respectively in center removable support and housing 12. The housing 12 has a sloping cover member 58 held on by screws 94. Both the housing 12 and cover 58 are cast aluminum in a practical embodiment of the invention, for example.

Hinge pins 14 and 16 are engaged by tongues 82 and 86 extending from paddle 18 and member 36, respectively, through slots 84 and 88, respectively, in the bottom of center support and housing 12.

Figure 2:
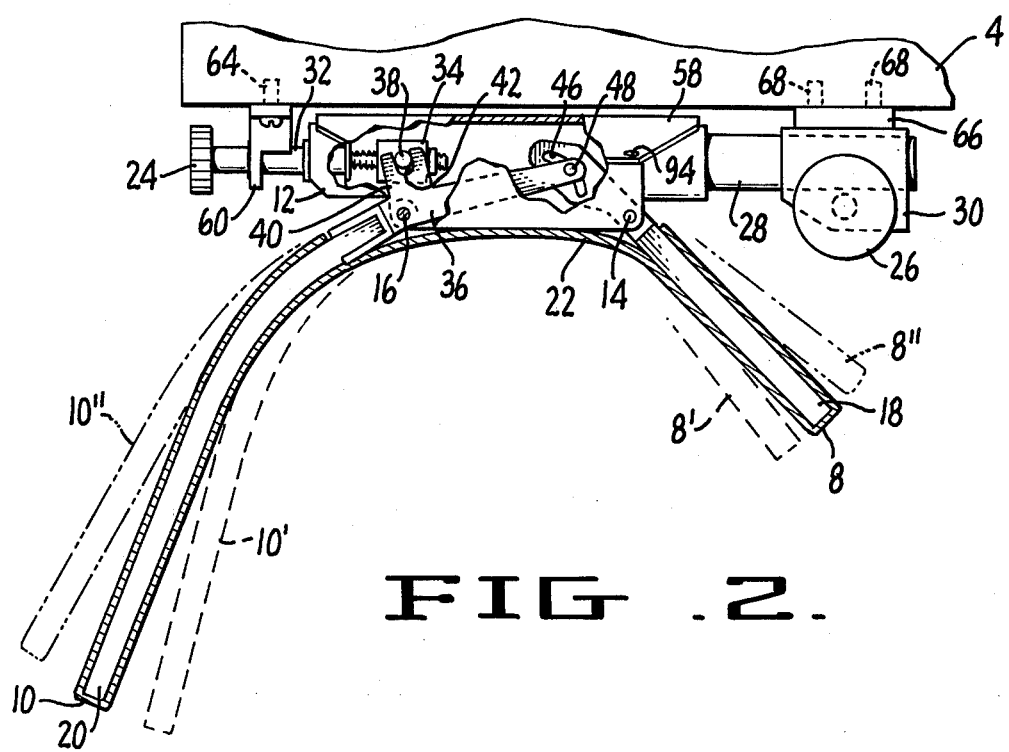
FIG. 2 — partially cut-away sectional side elevation view of the shoulder mount with a fragmentary representation of a camera body mounted thereon.

An end portion 44 of forward paddle 18 extends through a channel 78 in the bottom of center support 12 and contains a semicircular slot 46, forming a portion of the linkage between the pads 8 and 10. A hinge member 36 is fastened to the rearward paddle 20 by several screws 56 (one shown) and extends through a channel 80 in the bottom of center support 12. Member 36 is a separate piece from paddle 20 for ease in fabrication and it is also an aluminum casting in the exemplary practical embodiment referred to above. Functionally, members 36 and 20 are unitary. Member 36 is hinged by pins 16 and has a bifurcated end portion 50 carrying linkage pin 48 that rides in slot 46, thereby causing pads 8 and 10 to simultaneously move inwardly or outwardly in unison with respect to the operator's body as to positions 8' and 10' (inward) and 8" and 10" (outward) (FIG. 2).

Figure 3:
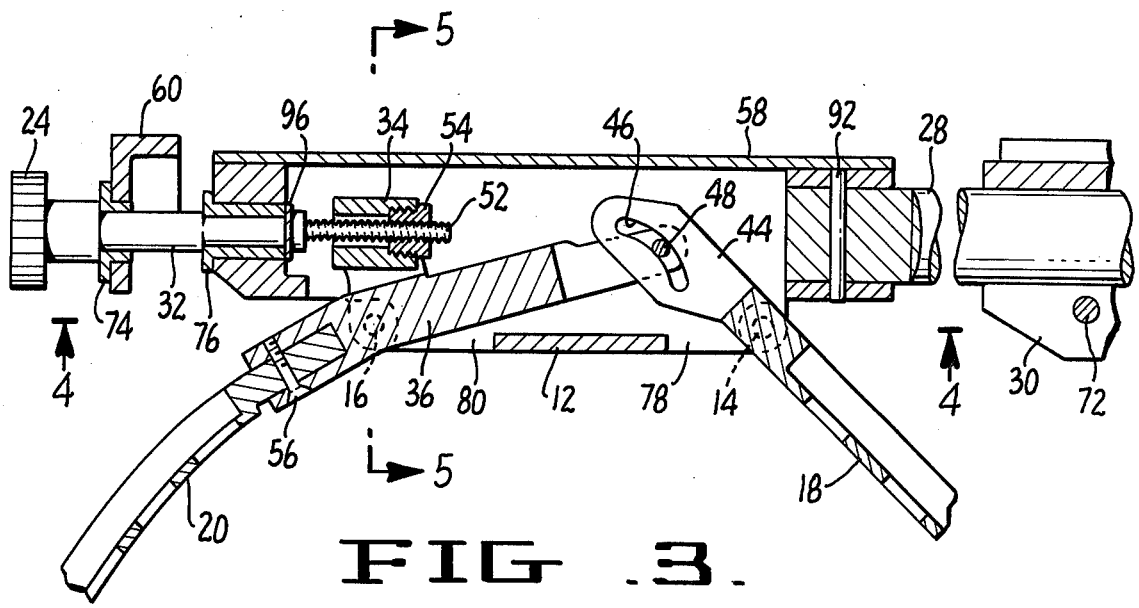
FIG. 3 — sectional side elevation view of the shoulder mount.

Member 36 also has a bifurcated cam finger having a cam channel 42 that captures cam actuating pins 40. Longitudinal movement (FIGS. 2, 3) of pins 40 drive the linkage between pads 8 and 10, causing the rotation of the pads along the hinge points 14 and 16.

Cam actuating pins 38 are driven by a block and screw arrangement comprising shoulder pad contour adjusting knob 24, contour adjusting shaft 32, threaded shaft portion 52, double threaded nut bushing 54 and cam actuating block 34. The axis of shaft 32 lies along the longitudinal axis of the shoulder mount 2.

Shaft 32 carries a rearward camera support bracket 60 and bushing 74 which are free to move on shaft 32. Increased shaft diameter near knob 24 limits the rearward movement of bracket 60. As shaft 32 passes through bushing 76 into the center support and housing 12 its diameter again reduces so that it is held from longitudinal movement by a C-ring 96. The remaining inside end of shaft 32 is threaded portion 52 for engaging the double threaded bushing nut 54 that is threaded into block 34. Thus, rotation of knob 24 causes longitudinal movement of block 34 thereby driving the cam and linkage described above. Knob 24 is preferably knurled for ease in grasping.

Figure 4:
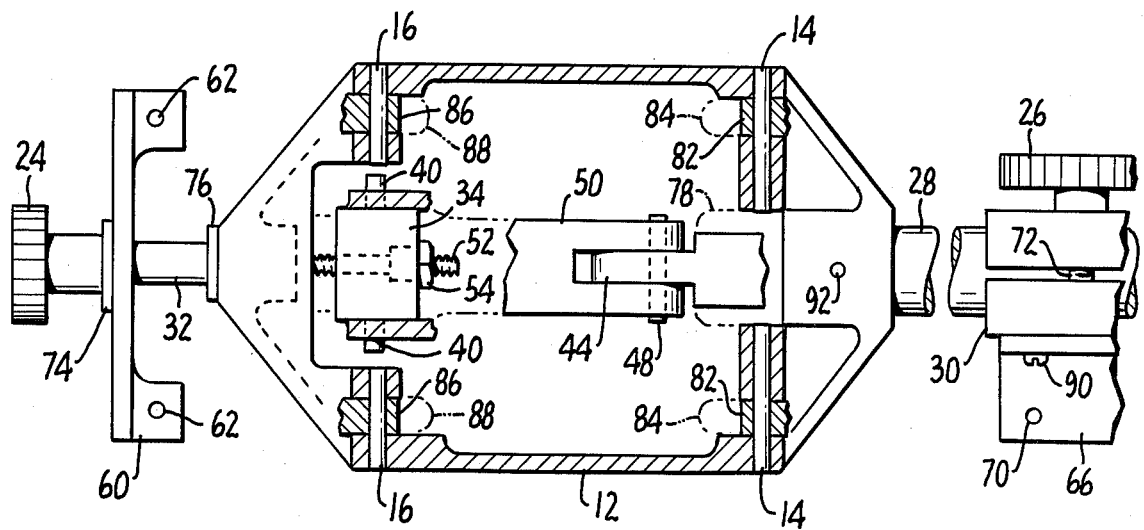
FIG. 4 — bottom plan view partially sectional along section lines 4—4 of FIG. 3.
Figure 5:
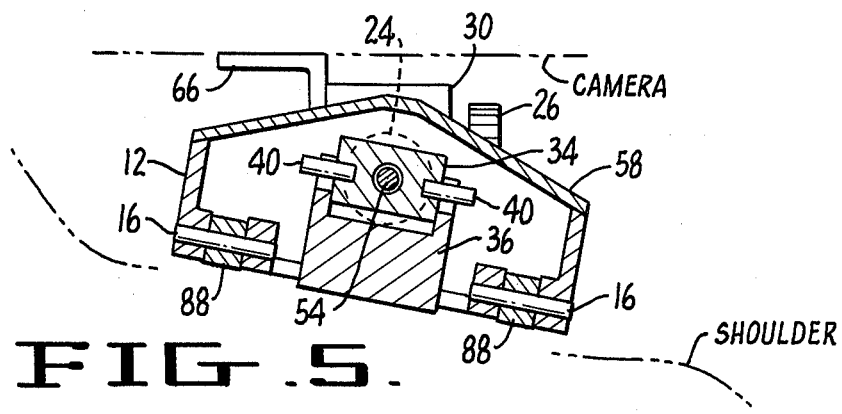
FIG. 5 — sectional rear elevation view along section lines 5—5 of FIG. 3.

Camera support bracket 60 is generally L-shaped in cross section (FIG. 3) and U-shaped in plan view (FIG. 4). A pair of holes 62 are adapted to receive screws 64 for holding the camera 4 to the bracket 60.

A forward support tube 28 extends from and forward of the center support and housing 12 and is fixed thereto by a pin 92. Tube 28 and shaft 32 lie along the same longitudinal axis. Tube 28 carries the forward camera support bracket 66, an L-bracket, which is fastenable to the camera body by screws 68 passing through holes 70 (one shown). Bracket 66 is carried on tube 28 by a bifurcated rotation and translation clamp 30 surrounding tube 28. Bracket 66 is held to clamp 30 by screws 90 (one shown). A knob 26 tightens the clamp 30 to inhibit movement of the clamp 30, bracket 66 and attached camera 4.

When clamp 30 is not tightened down on tube 28, the camera 4 is free to move rotationally along the longitudinal axis of tube 28 and shaft 32 and also translationally along the axis of tube 28 and shaft 32. Rotation is limited to plus or minus about 24° from the normal by engagement of the camera body bottom to the sloping cover 58 of center support and housing 12. Translation is limited by the abutment of bracket 60 and bushing 74 to the larger diameter shoulder of shaft 32 adjacent knob 24 at one extreme and by the abutment of bracket 60 to bushing 76 on the center support and housing 12 at the other extreme.

Rotational and translational clamping knob 26 has a shaft 72 with a threaded end that threads into the distal side of the bifurcated clamp 30. The shaft 72 diameter decreases as it enters the side of clamp 30 nearest knob 26 so that the shoulder thus formed causes the bifurcated ends of clamp 30 to be drawn together clamping tube 28 as knob 26 is rotated. Knob 26 is preferably knurled for ease in grasping.

In operation, the present shoulder mount with camera attached to brackets 60 and 66 is placed on either shoulder of the operator. Knob 24 is turned in one of the two directions to increase or decrease the spacing of pads 8 and 10 to conform as closely as possible to the operator's body. Then, the forward knob 26 is turned to loosen clamp 30 and the camera is translated fore or aft to center the camera and shoulder mount weight and is rotated, as necessary, to locate the camera upright. Clamp 30 is then tightened by knob 26 and the mount is thus optimized for the particular operator. Some individuals may prefer to reverse the procedure by adjusting the camera rotation and translation first, although the approach first described is thought to be preferred.

It will be apparent to those of ordinary skill in the art that the present invention may be modified in minor respects by the substitution of equivalent mechanical systems. For example, the linkage between pads 8 and 10 could be provided by a worm gear arrangement. Therefore, the scope of the invention is to be limited only by the appended claims.

I claim:

1. An anthropomorphic mount for supporting a camera type device on the shoulder of an operator comprising:
   an articulated saddle, having a center support and forward and rearward shoulder pads pivotally fixed to said center support with portions of said shoulder pads extending into said center support, for resting on the shoulder of said operator;
   camera type device supporting means mounted on said articulated saddle; and
   means for adjusting the contour of said saddle to the shoulder of said operator with said contour adjusting means including linkage means linking said portions for providing simultaneous inward and outward rotation of said shoulder pads relative to the shoulder of said operator and means adjustable by said operator for driving said linkage means to adjust the inward and outward rotation of said shoulder pads.

2. An anthropomorphic mount for supporting a camera type device on the shoulder of an operator comprising:
   an articulated saddle for resting on the shoulder of said operator,
   means for adjusting the contour of said saddle to the shoulder of said operator,
   camera type device supporting means rotatably and translatably mounted on said articulated saddle for adjusting said camera type device to the slope of the operator's shoulder and for adjusting the center of gravity of said camera type device on said operator's shoulder, and
   means for locking said supporting means from movement relative to said articulated saddle wherein said camera type device supporting means and said locking means include a support tube fixed to the forward portion of said articulated saddle center support, a rotation and translation bifurcated clamp partially surrounding said tube and having a plain hole through one of said bifurcated portions and a threaded hole in the other of said bifurcated portions, said holes being aligned, a camera type device supporting bracket, and a knob having a shaft, the end thereof being threaded to engage said clamp and having a shoulder to engage the outside of said clamp whereby turning said knob causes said bifurcated portions to tighten on said tube.

3. An anthropomorphic mount for supporting a camera type device on the shoulder of an operator comprising:

an articulated saddle, having a center support and forward and rearward shoulder pads pivotally fixed to said center support with portions of said shoulder pads extending into said center support, for resting on the shoulder of said operator;

camera type device supporting means mounted on said articulated saddle; and means for adjusting the contour of said saddle to the shoulder of said operator with said contour adjusting means including linkage means linking said portions for providing simultaneous inward and outward rotation of said shoulder pads relative to the shoulder of said operator with said linkage means including a semi-circular slot in the end portion of said forward shoulder pad and a pin fixed to the end portion of said rearward shoulder pad and said pin passing through said slot, whereby movement of said rearward shoulder pad about its hinge point induces movement in the opposite direction by said forward shoulder pad about its hinge point.

4. The combination of claim 1 wherein said means for driving said linkage means comprises a contour actuating block having a threaded hole passing therethrough and a shaft extending rearward of said articulated rotatable saddle center support having a knob at its rear end for operator adjustment and a threaded portion at its forward end for engaging said block, said block further having at least one pin extending from said block perpendicular to said threaded hole in said block, and said rearward shoulder pad extending into said articulated saddle center support having an extending finger portion having an actuating channel in the end thereof for engaging said pin, whereby movement of said actuating block in response to said knob and shaft drives said linkage by causing said rearward shoulder pad to rotate about its hinge point.

* * * * *